United States Patent [19]

Florindez

[11] Patent Number: 5,033,367
[45] Date of Patent: Jul. 23, 1991

[54] INDEXING MACHINE

[76] Inventor: Augusto Florindez, 13029 Ocaso Ave., La Mirada, Calif. 90638

[21] Appl. No.: 594,362

[22] Filed: Oct. 9, 1990

Related U.S. Application Data

[63] Continuation-in-part of Ser. No. 545,409, Jun. 28, 1990, which is a continuation-in-part of Ser. No. 356,118, May 24, 1989, Pat. No. 4,945,825.

[51] Int. Cl.$^5$ .................. A47J 27/00; B65B 35/46; B65G 47/29
[52] U.S. Cl. .................. 99/353; 53/251; 53/534; 99/427; 99/443 C; 198/431
[58] Field of Search ............... 99/334, 352, 353, 354, 99/355, 426, 427, 440, 443 R, 443 C; 198/418.6, 431, 465.1; 53/246, 251, 534, 539

[56] References Cited

U.S. PATENT DOCUMENTS

| | | | |
|---|---|---|---|
| 3,225,513 | 12/1965 | Ehe | 198/431 |
| 3,339,704 | 9/1967 | Clark et al. | 198/431 X |
| 3,662,676 | 5/1972 | Hartz | 99/443 C |
| 3,854,569 | 12/1974 | Steinhart et al. | 198/431 |
| 3,877,563 | 4/1975 | Hayashi | 198/418.6 |
| 3,894,631 | 7/1975 | Rose et al. | 198/418.6 |
| 4,534,687 | 8/1985 | Antpohler | 99/353 |
| 4,911,284 | 3/1990 | Weihe et al. | 198/465.1 |

Primary Examiner—Timothy F. Simone
Attorney, Agent, or Firm—Plante Strauss Vanderburgh and Connors

[57] ABSTRACT

Disclosed is a machine for advancing bakery pans in a step wise fashion along a production line. A rotary indexer having three radially extending arms mounted on a common shaft and spaced apart 120° relative to adjacent arms is used to advance the pans step-wise one cup at a time. Each arm has distal ends at which rollers are mounted which engage the upper portion extending about the perimeter of each cup. A single stroke air cylinder has a wedge mounted to its piston. The wedge engages a cam assembly mounted on the shaft to which the rotary indexer is mounted. Retraction of the wedge allows the pans to push against the rotary indexer to rotate it. The wedge returns to a position to stop rotation of the shaft, only allowing the shaft to rotate through a 120° turn. The pan moves step-wise along the assembly line path into a position to receive a dough packet from a conveyor that deposits dough packets into the cups. The rotary indexer is mounted to be moved manually towards and away from the path of travel of the pans to accommodate pans having cups of different depths.

3 Claims, 2 Drawing Sheets

INDEXING MACHINE

RELATED PATENT APPLICATIONS

This application is a continuation-in-part application of the parent U.S. patent application Ser. No. 07/545,409, filed June 28, 1990 and entitled, "Reciprocating Indexing Machine for Baking Pans," which is a continuation-in-part application of U.S. patent application Ser. No. 07/356,118, filed May 24, 1989 and entitled, "Indexing Machine for Baking Pans," issued as U.S. Pat. No. 4,945,825. These prior U. S. patent applications are incorporated herein by reference and made part of this continuation-in-part application.

BACKGROUND OF THE INVENTION

1. Background of the Invention

This invention relates to a machine for manufacturing bakery products, particularly bread loaves.

2. Background Discussion

In the baking industry, it is common practice to utilize baking pans to make such products as hot dog buns, hamburger buns, bread loaves, and other bakery products. The baking pans are generally of a rectangular configuration and include rows of cups which hold dough packets. In the case of bread loaves, the pan has a series of one large cups, and a series of large cylindrical dough packets are moved by conveyers and deposited in the baking pans automatically, cup by cup. As this is done, the pans are moved in a step-wise fashion along a predetermined path, to a point where they can be deposited in the cups. In other words, each cup of the pan has a dough packet placed in it, with the dough packets being deposited one cup at a time in the baking pan. Sometimes the equipment malfunctions and dough packets are not deposited in the cup as required. Depending on the type of bread being made the depth of the cup varies.

SUMMARY OF THE INVENTION

It is the objective of this invention to provide an indexing machine particularly adapted to be used in the manufacture of loaves of bread.

The machine of this invention has several features, no single one of which is solely responsible for its desirable attributes. Without limiting the scope of this invention as expressed by the claims which follow, its more prominent features will now be discussed briefly. After considering this discussion, and particularly after reading the section of this application entitled, "DETAILED DESCRIPTION OF THE PREFERRED EMBODIMENT," one will understand how the features of this invention provide its advantages, which include safety, reliability, low noise, smooth running, and simplicity of use.

The first feature of this invention is that the bakery pan employed has a series of cups, each cup having an upper portion extending about the perimeter of the cup. The cups are arranged in series and are spaced apart a predetermined distance. The dough packets for the bread loaves are deposited individually into the cups as the pan is advanced incrementally cup by cup along a predetermined path.

The second feature of this invention is that the means for advancing pans along the path include a rotary indexer. This indexer has three radially extending arm members mounted to a common generally horizontal shaft. The arm members are spaced apart 120° relative to adjacent arm members. Each arm member has at its distal end a roller element. One arm at a time is positioned within a cup and engages the upper portion extending about the perimeter of the cup. As the pan moves step-wise along the path, the arm in a cup is withdrawn and the arm next in sequence is inserted into the next cup in the series of cups. This positions the pans, moving the cups sequentially into a position to receive a dough packet from depositing means. As the dough packet falls into the cup, a signal is generated for rotating the shaft through a 120° turn. This advances the pans incrementally one cup at a time, stopping the advancement of the pans momentarily to position the next cup to be filled with a dough packet.

The fourth feature is that the rotary indexer is mounted to move towards and away from the path of travel of the pans to accommodate pans having cups of different depths.

BRIEF DESCRIPTION OF THE DRAWING

The preferred embodiment of this invention, illustrating all its features, will now be discussed in detail. This embodiment depicts the novel and non-obvious machine of this invention shown in the accompanying drawing, which is for illustrative purposes only. This drawing includes the following Figs., with like numerals indicating like parts.

DETAILED DESCRIPTION OF THE PREFERRED EMBODIMENT

Figure 1:
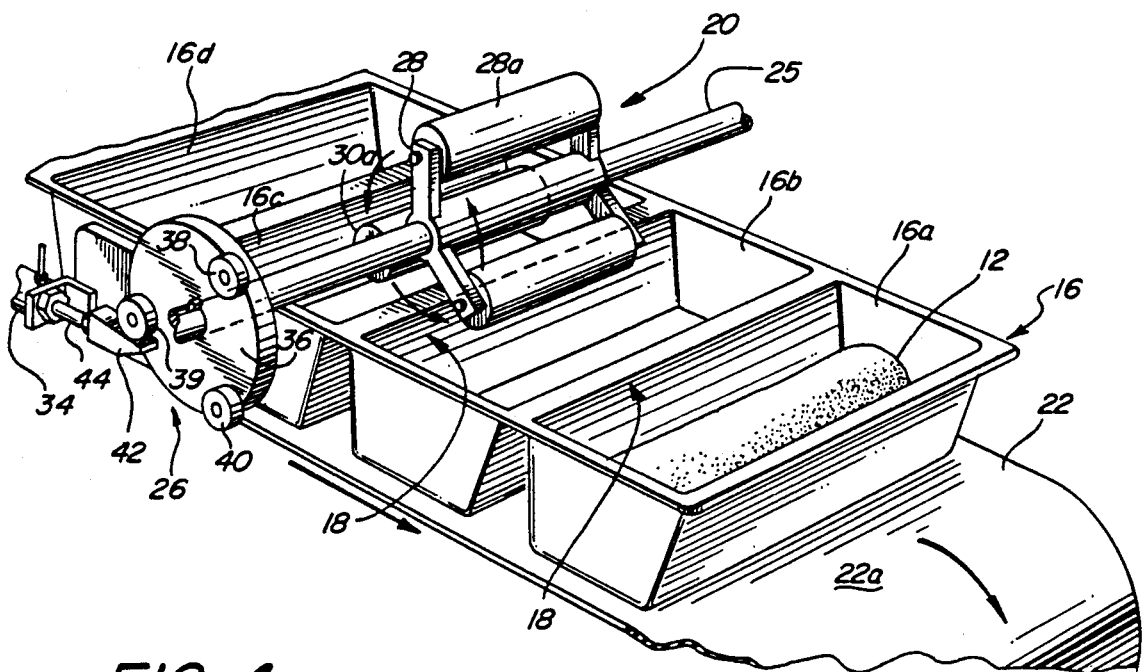
FIG. 1 is a perspective view of the rotary indexer used in the indexing machine of this invention.
Figure 4:
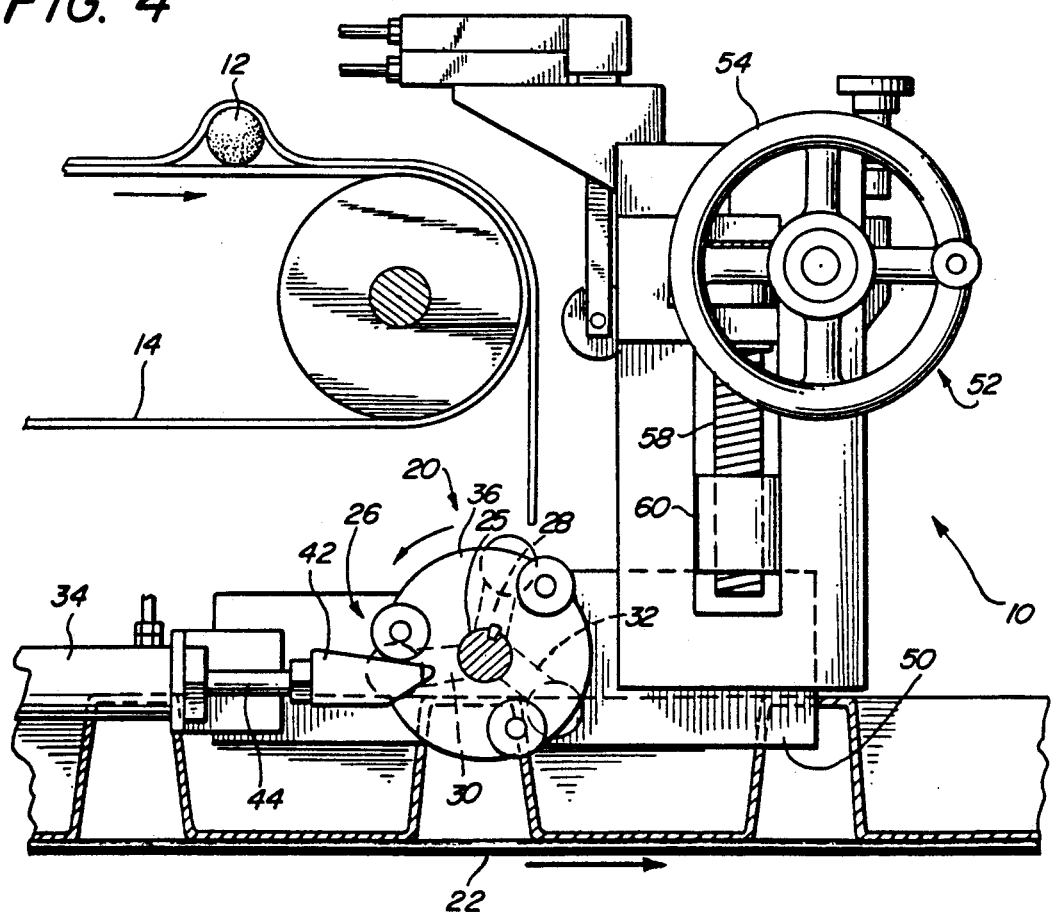
FIG. 4 is a side elevational view similar to that shown in FIG. 2 illustrating the rotary indexer lowered to accommodate a pan with cups shallower than depicted in FIGS. 2 and 3.
Figure 2:
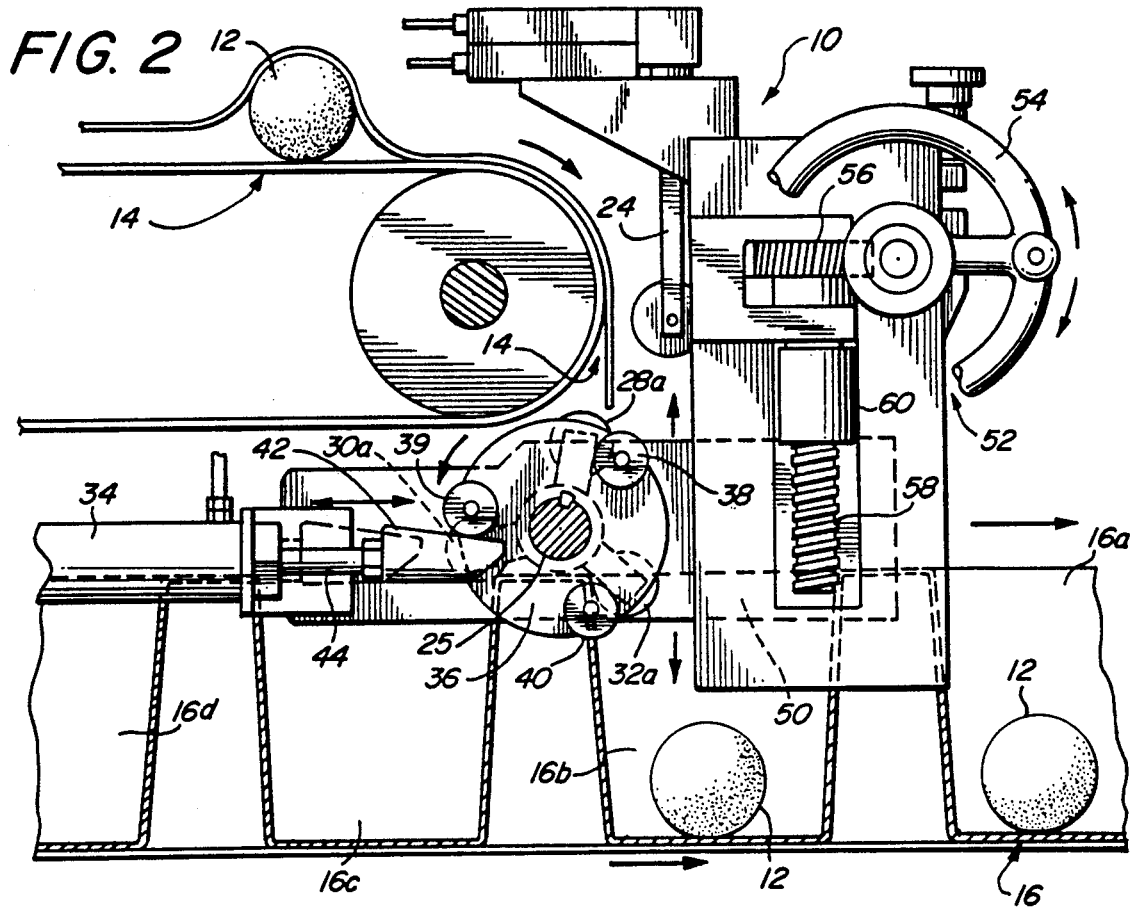
FIG. 2 is a side elevational view showing the indexing machine of this invention.
Figure 3:
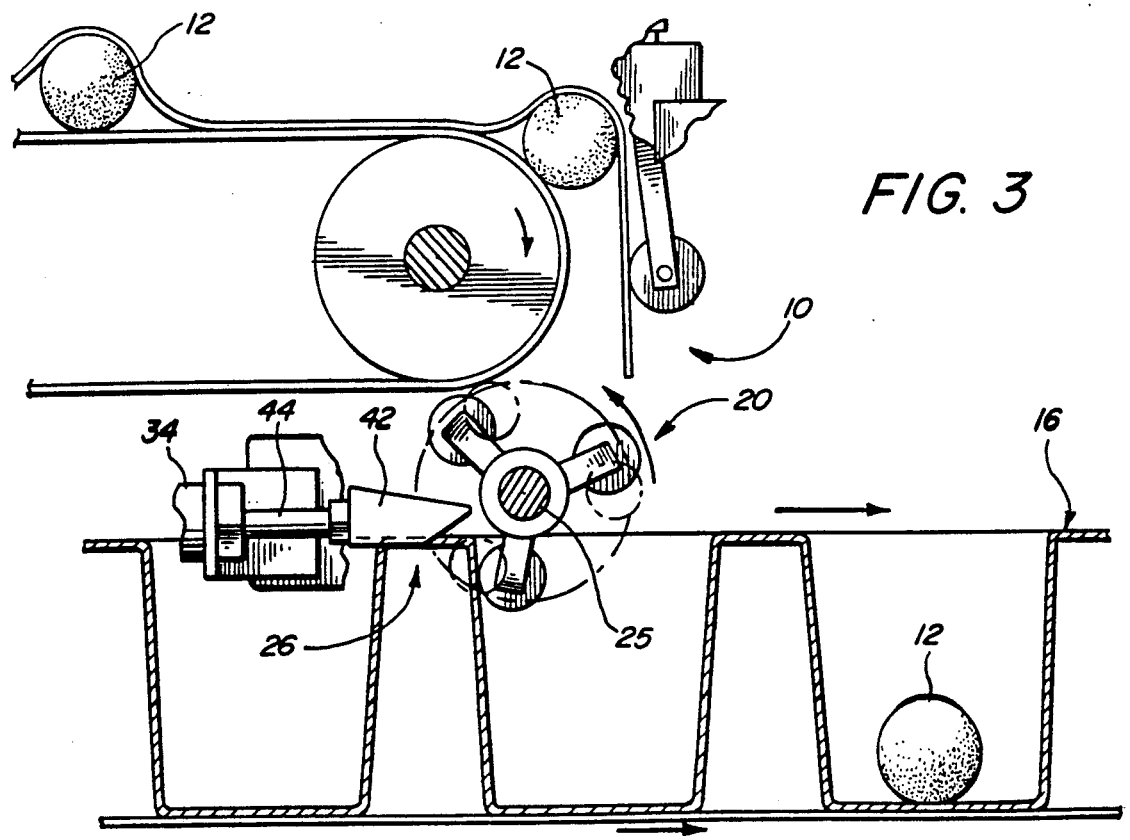
FIG. 3 is a side elevational view similar to that shown in FIG. 2 illustrating the function of the rotary indexer shown in FIGS. 1 and 2.

As shown in FIGS. 1, 2 and 3, the indexing machine 10 of this invention is positioned in an assembly line for manufacturing loaves of bread. In making the bread, dough packets 12, generally of a cylindrical configuration, are moved by an upper horizontal conveyor 14 along an upper horizontal pathway. When the packets 12 reach the end 14a of the conveyor 14, they fall off the conveyor, downwardly into a cup of a pan 16 positioned to catch the falling dough packet.

The pans 16 include a series of cups 16a, 16b, 16c, and 16d which have upper portions 18 around the perimeter of the cups 16a–16d which engage a rotary indexer 20. The pans 16 are carried on a lower horizontal conveyor 22 which continually moves. The rotary indexer 20, engaging the upper portion of each individual cup as the cup advance one at a time, holds the pans 16 in a stationery position for a sufficient period of time to allow individual dough packets 12 to fall into a cup (cups 16a, 16b, 16c, or 16d as the case may be) positioned beneath the end 14a of the conveyor 14. When the rotary indexer 20 is turned through a 120° turn, the pan 16 advances an increment equal to the distance between adjacent cups, for example cups 16b and 16c as illustrated in FIGS. 2 and 3. Step wise movement of the pan 16 positions the next empty cup beneath the end 14a of the conveyor 14 to catch the next dough packet falling from this conveyor. An electric eye, a switch arm, or other type of sensor 24 detects a dough packet 12 as it falls from the conveyor 14 and provides a control signal.

The rotary indexer includes a generally horizontal shaft 25 mounted at its ends in bearings that enable the shaft to rotate freely and pivot at its ends. Three arm members 28, 30, and 32 extend radially outwardly from the shaft 25 and are displaced from each other by 120°. At the distal end of each arm member 28, 30, and 32 is a nylon roller 28a, 30a, and 32a, respectively. A cam subassembly 26 controls the rotation of the shaft 25, with the pressure produced by the advancing pans 16 providing the motive force to rotate the shaft 25 in a counterclockwise direction as viewed in FIG. 2.

As shown in FIG. 2, the nylon roller 32a engages the upper portion 18 of the cup 16b of the pan 16 to prevent the pan from moving to the right as shown in FIG. 2. The top flight 22a of the conveyor 22 slides underneath the pan 16. When the shaft 25 rotates, the arm 32 and attached roller 32a are moved in a circular direction up and away from the upper portion 18 of the cup 16b and out of the mouth of the cup 16b to allow the pan 16 to be moved by the conveyor 22 to the right. This brings the next arm 30 and roller member 30a into the mouth of the next cup 16c. As the pan 16 moves to the right, the upper portion 18 of the cup 16c next engages the roller 30a. Thus, with each 120° turn of the shaft 25, the pan 16 advances in increment corresponding to the distance between adjacent cups (in this case 16b and 16c) in the pan. The arm members 28, 30, and 32 are positioned to allow a dough packets 12 to fall unobstructed into a cup beneath the end 14a of the conveyor 14.

The cam subassembly 26 includes a single stroke spring return piston air cylinder 34 and a circular block 36. The circular block 36 is mounted to an end of the shaft 25 in a fixed position and rotates as the shaft rotates upon movement of a cup to a position beneath the end 14a of the conveyor 14. On the face of the block 36 are three roller cam followers 38, 39, and 40 spaced apart 120° from each other. The cam followers 38, 39, and 40 are displaced 20° with respect to the rollers 28a, 30a, and 32a. This provides sufficient time for the rollers 28a, 30a, and 32a to clear the upper portions 18 of the cups, with the next roller in sequence moving into position within the mouth of the next cup in the series to advance beneath the end 14a of the conveyor 14.

The air cylinder 34 has a wedge member 42 attached to its piston 44. This cylinder 34 is mounted adjacent the circular block 36 and positioned so that the wedge member 42 will engage a cam follower 38 40 as the case may be, when the piston 44 is in the extended position. The wedge member 42 is lodged between two nylon bearing blocks (not shown) so that it slides quickly back and forth to move out of engagement with a cam follower and then into engagement with the next cam follower. As shown in FIG. 2, when the piston is withdrawn, the wedge member 42 moves inwardly to allow the cam follower 39 it is engaging to move to the position of the cam follower 40. With the wedge member 42 withdrawn, the pressure of the advancing pan 16 produced by the conveyor 22 causes the shaft 25 to rotate through a 120° turn. The air cylinder is actuated by the control signal to withdraw the piston every time a dough packet 12 falls from the end 14a of the conveyor 14.

The rotary indexer 20 is carried by rods (not shown) that extend crosswise relative to the path of travel of the pan 16 along the assembly line. These rods are mounted between a pair of moveable plates 50 (only one shown) that are moved by a conventional wheel and screw assembly 52 towards and away from the upper flight 22a of the lower conveyor 22 to raise and lower the rotary indexer 20 relative to the conveyor 22. This allows the machine 10 to be adjusted to accommodate pans 16 having cups of different depths. The plates 50 are carried by rods (not shown). The wheel and screw assembly 52 includes a hand wheel 54 coupled to a pair of worm gears 56 (only one shown). Each worm gear 56 engages a screw 58 which is carried in a nut 60 securely attached to a plate 50 so that turning the hand wheel 52 turns the worm gear 56 which in turn rotates the screws 58 within the nuts 60, causing the plates 50 to move in a vertical direction relative to the path of travel of the pans. FIG. 3 illustrates the rotary indexer 20 move to a lower position for use with pans 16 of shallow depth.

Operation

In the course of making loaves of bread, the cylindrical dough packets 12 are deposited on the upper flight of the conveyor 14 and move to the right as shown in FIG. 2 to the end 14a of the conveyor. Upon reaching the end 14a of the conveyor, a dough packet 12 falls off the conveyor past the sensor 24 which then provides a control signal for actuating the air cylinder. This results in withdrawal of its piston 44, with a spring (not shown) of the cylinder 34 returning the piston 44 and wedge member 42 to the extended position shown in FIG. 2. This moves the wedge member inwardly to allow the shaft 25 to rotate through a 120° turn.

During each stroke of the cylinder 34 a brief time interval elapses. This time interval is a few seconds and is set to allow the dough packet 12 to fall freely into a cup beneath the end 14a of the conveyor 14. With the wedge member 42 withdrawn, the pan 16 pushes against an arm of the rotary indexer to rotate this indexer. This brings one roller member up and outwardly from the mouth of the cup into which the dough packet 12 is deposited, allowing the conveyor 22 to move the pan to the right. The wedge member is returned to its extended position to engage the next cam follower and stop the rotational movement of the shaft 25 before the pan advances a distance greater than the distance between adjacent cups. This corresponds to a 120° turn of the indexer 20. Consequently, each cup is moved in a stepwise fashion into position to catch a dough packet 12 as it falls from the end 14a of the conveyor 14. When different size pans are used requiring the rotary indexer 20 to be, for example, lowered, the wheel 54 is turned to lower the rotary index 20 to the position illustrated in FIG. 3.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims.

I claim:

1. A machine for manufacturing bakery products, including means for depositing individual dough packets into individual cups of a bakery pan having a series of cups, each cup having an upper portion extending about the perimeter of each cup, said cups being spaced apart a predetermined distance and said dough packets being deposited sequentially cup by cup as the pan is advanced incrementally along a predetermined path, means for advancing the pans along said path including rotary indexing means having three radially extending arm members mounted on a common shaft and spaced apart 120° relative to adjacent arm members, each of said arm members having distal ends at which roller elements are mounted which engage said upper portion extending about the perimeter of each cup as the pan moves along said path into a position to receive a dough packet from the depositing means, and means for rotating the shaft through a 120° turn each time a dough packet is to be deposited in an empty cup to advance the pans incrementally cup by cup, stopping the advancement of the pans momentarily to position the cups to receive the dough packets.

2. The machine of claim 1 including means for mounting the rotary indexing means to move said indexing means towards and away from the path of travel of the pans to accommodate pans having cups of different depths.

3. The machine of claim 1 wherein the means for depositing the dough packets is above the path of travel of the pans and the dough packets fall from the depositing means into the cup of a pan position to receive the dough packet as said packet falls, said machine including sensing means are positioned to detect the falling packet and signal the shaft to rotate through a 120° turn.

* * * * *